United States Patent
Sheridan (10) Patent No.: US 9,926,850 B2
(45) Date of Patent: Mar. 27, 2018

(54) COMPOUND STAR GEAR SYSTEM WITH ROLLING ELEMENT BEARINGS

(71) Applicant: United Technologies Corporation, Hartford, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 1090 days.

(21) Appl. No.: 14/170,687

(22) Filed: Feb. 3, 2014

(65) Prior Publication Data

US 2014/0227084 A1  Aug. 14, 2014

Related U.S. Application Data

(60) Provisional application No. 61/763,103, filed on Feb. 11, 2013.

(51) Int. Cl.
*F02C 7/36* (2006.01)
*F16H 1/46* (2006.01)
*F16H 1/22* (2006.01)

(52) U.S. Cl.
CPC .............. *F02C 7/36* (2013.01); *F16H 1/227* (2013.01); *F16H 1/46* (2013.01); *F05D 2220/327* (2013.01); *F05D 2260/40311* (2013.01)

(58) Field of Classification Search
CPC ... F02C 7/36; F16H 1/227; F16H 1/46; F16H 1/22; F16H 1/30; F16H 2001/289; F01D 5/141; F02K 3/06; F05D 2220/327; F05D 2260/40311

USPC .................... 415/124.1; 416/170 R
See application file for complete search history.

(56) References Cited

U.S. PATENT DOCUMENTS

| | | | |
|---|---|---|---|
| 4,251,987 A * | 2/1981 | Adamson | F02C 3/113 |
| | | | 417/405 |
| 4,825,723 A | 5/1989 | Martin | |
| 5,133,182 A * | 7/1992 | Marcos | F02C 9/28 |
| | | | 60/39.27 |
| 6,223,616 B1 | 5/2001 | Sheridan | |
| 6,783,478 B2 | 8/2004 | Larson | |
| 6,964,155 B2 | 11/2005 | McCune et al. | |
| 7,410,442 B2 * | 8/2008 | Fox | F16C 19/364 |
| | | | 416/170 R |
| 8,015,900 B2 * | 9/2011 | Gmirya | B64C 27/12 |
| | | | 74/409 |
| 8,205,432 B2 | 6/2012 | Sheridan | |
| 2004/0255590 A1 | 12/2004 | Rago et al. | |

(Continued)

OTHER PUBLICATIONS

Mellenkamp, Adam; Helical Gears Help Manufacturers go Green, Machine Design, May 4, 2011, http://machinedesign.com/mechanical-drives/helical-gears-help-manufacturers-go-green.*

*Primary Examiner* — Logan Kraft
*Assistant Examiner* — Danielle M Christensen
(74) *Attorney, Agent, or Firm* — Carlson, Gaskey & Olds, P.C.

(57) ABSTRACT

A compound star gear system includes a sun gear rotatable about a first axis that drives a first plurality of star gears rotatable about a plurality of fixed axes. The first plurality of star gears drives a second plurality of star gears spaced axially apart from the first plurality of star gears. The second plurality of star gears drive the ring gear that in turn drives a fan drive shaft.

19 Claims, 6 Drawing Sheets

(56) References Cited

U.S. PATENT DOCUMENTS

| | | | |
|---|---|---|---|
| 2008/0190095 A1* | 8/2008 | Baran | F02K 1/002 60/226.3 |
| 2009/0074565 A1 | 3/2009 | Suciu et al. | |
| 2010/0105516 A1 | 4/2010 | Sheridan et al. | |
| 2011/0105270 A1* | 5/2011 | Matsuoka | F02C 7/36 475/331 |
| 2012/0272762 A1 | 11/2012 | Sheridan | |

* cited by examiner

COMPOUND STAR GEAR SYSTEM WITH ROLLING ELEMENT BEARINGS

CROSS-REFERENCE TO RELATED APPLICATION

This application claims priority to U.S. Provisional Application 61/763,103 filed Feb. 11, 2013.

BACKGROUND

A gas turbine engine typically includes a fan section, a compressor section, a combustor section and a turbine section. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one or more low pressure turbine sections provides an input to the epicyclical gear assembly that drives the fan section at a reduced speed such that both the turbine section and the fan section can rotate at closer to optimal speeds.

One type of gear assembly is referred to as a star gear assembly. In a star gear assembly a central or sun gear drives a plurality of intermediate or star gears driven that are supported by a fixed carrier. The star gears in turn drive a ring gear that drives the fan section. Because the carrier supporting the star gears remains fixed, a smaller load is encountered by bearings supporting rotation of the star gears due to lack of centrifugal forces. The reduced loads make roller elements practical instead of higher load capacity journal bearings. Although rolling element bearings are typically larger and heavier than journal bearings for the same load, they do not require an auxiliary lubrication system in case of oil interruption during flight. The weight savings by eliminating the auxiliary lubrication system offsets the weight increase of the larger rolling element bearings. Additionally, rolling element bearings can be used to offset the turbo-machinery thrust loads while journal bearings may not be capable of doing so. Lastly, the practical gear ratios available in a typical single stage star gear assembly are constrained by physical size limitations and these can be expanded to higher gear ratios by using a two stage compound star gear arrangement.

Although geared architectures have improved propulsive efficiency, turbine engine manufacturers continue to seek further improvements to engine performance including improvements to thermal, transfer and propulsive efficiencies.

SUMMARY

A fan drive gear assembly according to an exemplary embodiment of this disclosure, among other possible things includes a sun gear rotatable about a first axis, a first plurality of star gears driven by the sun gear and rotatable about a plurality of fixed axes, a second plurality of star gears rotatable with the first plurality of star gears about the plurality of fixed axes, a ring gear driven by the second plurality of star gears, and a fan drive shaft driven by the ring gear.

In a further embodiment of the foregoing fan drive gear assembly, sun gear and the first plurality of star gears are engaged within a first plane and the second plurality of star gears and the ring ear are engaged within a second plane spaced axially apart from the first plane.

In a further embodiment of any of the foregoing fan drive gear assemblies, each of the first plurality of star gears comprises a first diameter and each of the second plurality of star gears comprises a second diameter greater than the first diameter.

In a further embodiment of any of the foregoing fan drive gear assemblies, the first plurality of star gears and the second plurality of star gears are supported for rotation by corresponding pluralities of rolling elements.

In a further embodiment of any of the foregoing fan drive gear assemblies, the rolling elements include cylindrical roller bearings.

In a further embodiment of any of the foregoing fan drive gear assemblies, the rolling elements include spherical roller bearings.

In a further embodiment of any of the foregoing fan drive gear assemblies, the rolling elements include tapered roller bearings.

In a further embodiment of any of the foregoing fan drive gear assemblies, includes a plurality of shaft supporting rotation of the first and second plurality of star gears.

In a further embodiment of any of the foregoing fan drive gear assemblies, the first plurality of star gears include helical gears including a first helix angle and the second plurality of star gears include helical gears including a second helix angle opposite the first helix angle.

In a further embodiment of any of the foregoing fan drive gear assemblies, the sun gear includes a helical gear including a primary helix angle disposed opposite the first helix angle of the first plurality of star gears.

In a further embodiment of any of the foregoing fan drive gear assemblies, includes a carrier supporting the plurality of first star gears and second star gears.

In a further embodiment of any of the foregoing fan drive gear assemblies, the gear assembly includes a gear reduction ratio up to about 5.0.

A gas turbine engine according to an exemplary embodiment of this disclosure, among other possible things includes a fan rotatable about an engine axis, a core engine section including a turbine section, and a fan drive gear system driven by the turbine section for driving the fan. The fan drive gear system includes a sun gear rotatable about the engine axis. A first plurality of star gears is driven by the sun gear and rotatable about a plurality of fixed axes. A second plurality of star gears is rotatable with the first plurality of star gears about the plurality of fixed axes. A ring gear is driven by the second plurality of star gears, and a fan drive shaft driven by the ring gear.

In a further embodiment of the foregoing gas turbine engine, the core engine section includes a compressor section having a low pressure compressor and a high pressure compressor and the low pressure compressor is driven a speed common with the fan drive shaft.

In a further embodiment of any of the foregoing gas turbine engines, the core engine section includes a compressor section having a low pressure compressor and a high pressure and the turbine section includes a low pressure turbine and a high pressure turbine and the low pressure compressor is rotated at a speed common with the low pressure turbine.

In a further embodiment of any of the foregoing gas turbine engines, the fan drive gear system includes a gear reduction ratio of up to about 5.0.

In a further embodiment of any of the foregoing gas turbine engines, the first and second plurality of star gears are supported by rolling element bearings.

In a further embodiment of any of the foregoing gas turbine engines, the rolling element bearings include cylindrical roller bearings.

In a further embodiment of any of the foregoing gas turbine engines, the rolling element bearings include spherical roller bearings.

In a further embodiment of any of the foregoing gas turbine engines, the rolling element bearings include tapered roller bearings.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
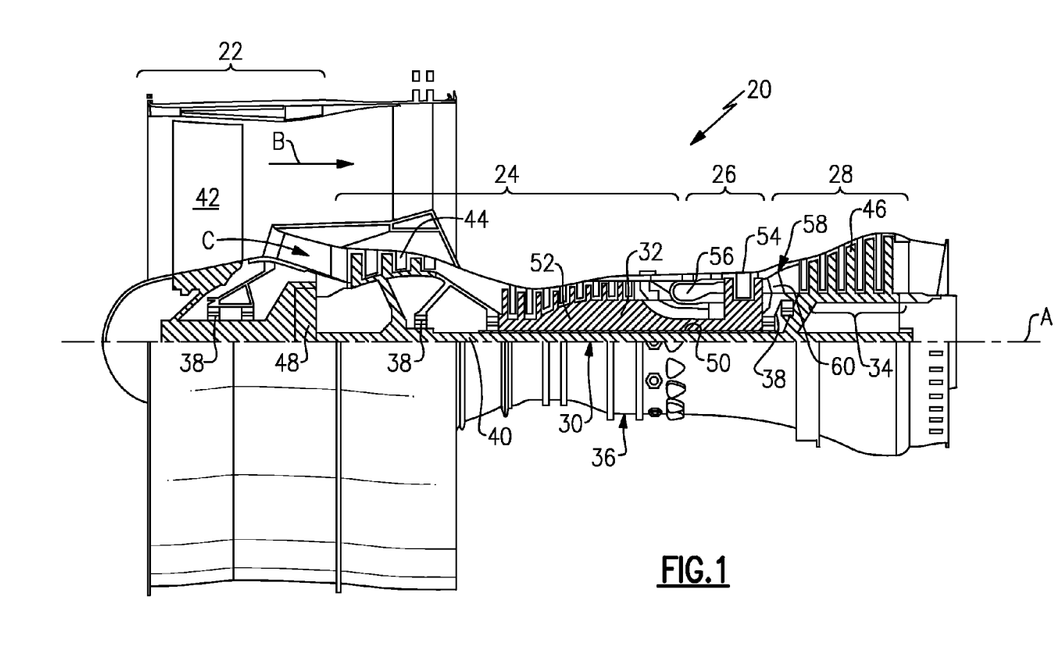
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example engine 20 includes the low pressure compressor 44 that is driven by the inner shaft 40. The example low pressure compressor 44 is directly connected to the inner shaft 40 that is driven by the low pressure turbine 46. Accordingly, the low pressure compressor 44 rotates at a speed common to the low pressure turbine 46. Therefore, the example low pressure compressor 44 is commonly described as a high speed low pressure compressor.

Figure 2:
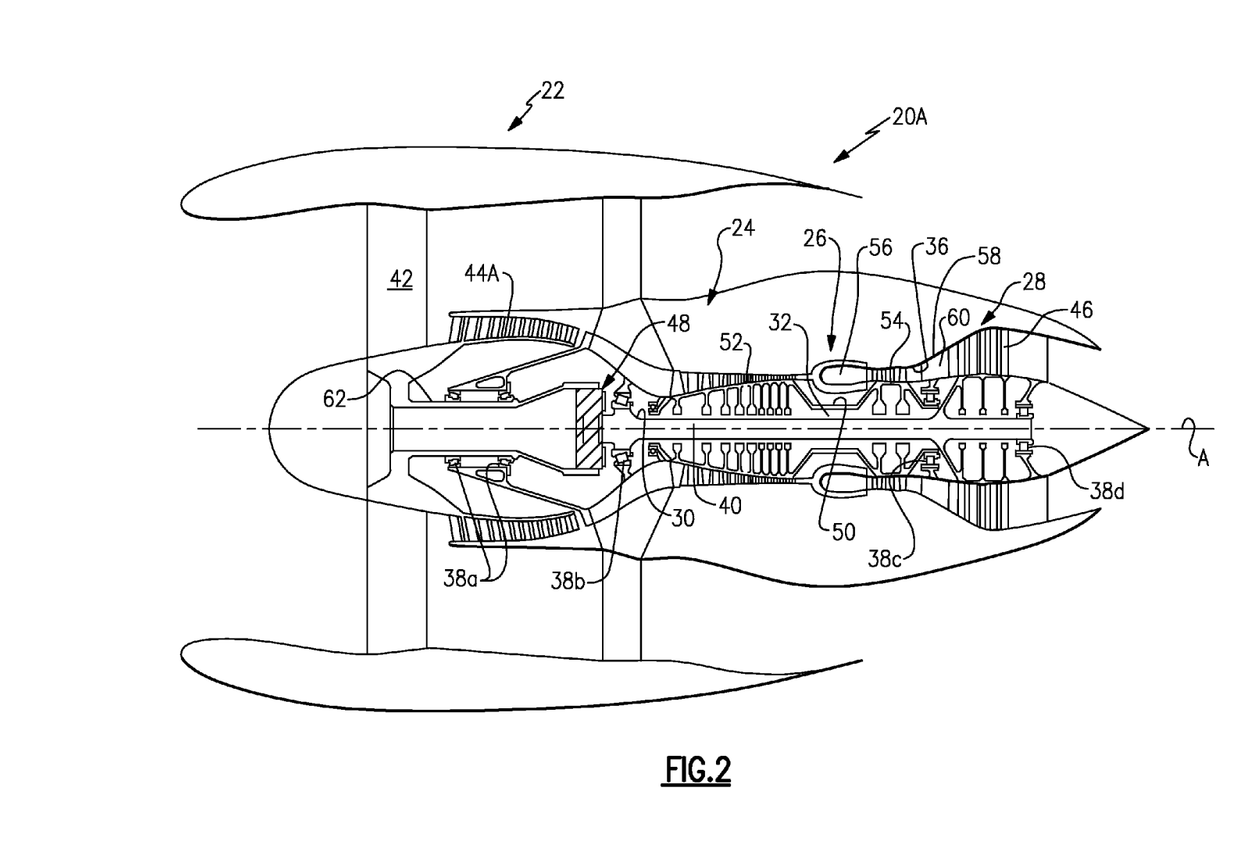
FIG. 2 is another example view of a gas turbine engine including a compressor section that rotates at a speed common to the fan.

Referring to FIG. 2, another example engine assembly 20a includes low pressure compressor 44a that is driven by a fan shaft 62 that also drives the fan section 42. In this example engine, the fan shaft 62 that is driven by the geared architecture 48 also drives the low pressure compressor 44a. Accordingly, the low pressure compressor 44a and the fan section 22 rotate at a common speed that in this example is less than the speed of the low pressure turbine 46. This configuration is commonly referred to as a low speed low pressure compressor configuration. The example geared architecture 48 can be configured to operate and perform in engine configurations that include a high speed low pressure compressor as is disclosed and shown in FIG. 1 or may be utilized to provide a low speed low pressure compressor 44a as is shown in FIG. 2.

Figure 3:
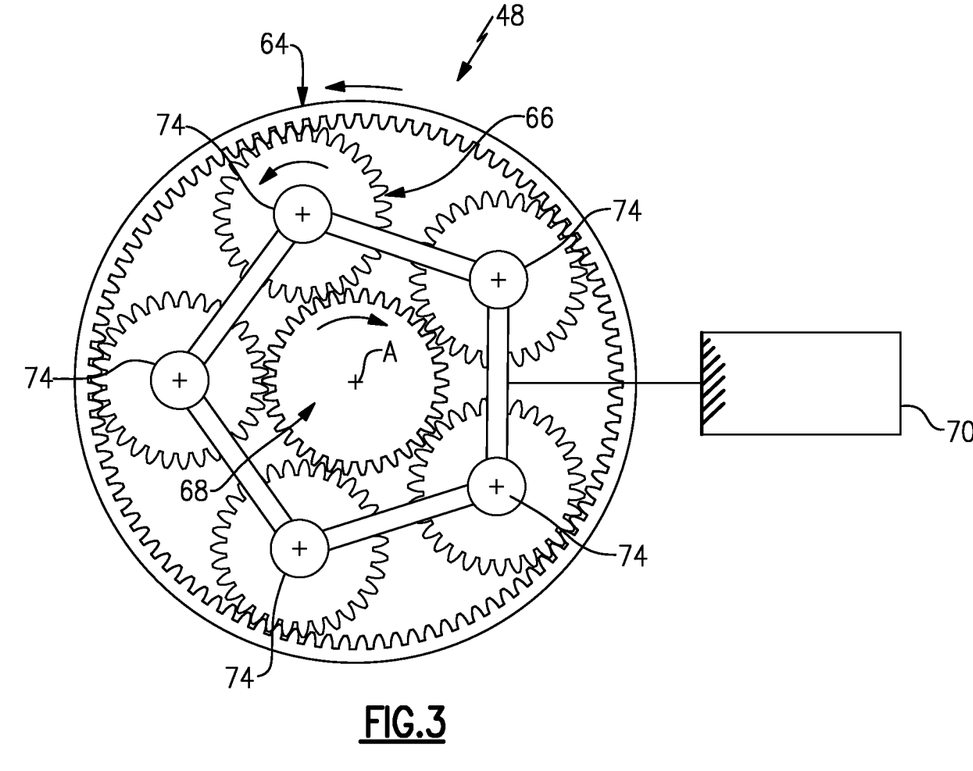
FIG. 3 is a schematic view of an example star gear system.

Referring to FIG. 3, the example geared architecture 48 is an epicyclical gear system and, more specifically a star gear system. The example star gear system includes a sun gear 68 driven by a fan drive turbine, which as illustrated is the low pressure turbine 46. The sun gear 68 in turn drives the intermediate star gears 66A, 66B, etc. (hereinafter collectively "Star Gears 66"). The star gears 66 fixed to carrier assembly 70, rotate about axes 74A, 74B, etc., that are fixed relative to the engine axis A. The plurality of star gears 66 drives a ring gear 64 that drives the fan shaft 62.

The difference between the star gear system illustrated in FIG. 3 and a planet gear system (not illustrated) is that the carrier 70 is fixed for the star gear systems, whereas in a planetary gear system, the ring gear is fixed and the carrier rotates and drives the fan shaft 62. In planet gear systems, high centrifugal loads are encountered on the shafts supporting rotation of the intermediate gears due to rotation of the carrier about the engine axis A.

Star gear systems are constrained by certain physical limitations due to relative sizes between the sun gear 68 and the star gears 66. As a size of the sun gear 68 increases, the star gear 66 decrease in size. Conversely, when the star gears increase in size, the size of the sun gear 68 must decrease. Therefore, for a given space, the reduction ratio provided by the star gear system is limited. Moreover, the use of preferred rolling bearing elements can be limited when using larger sized sun gear 68 and/or star gear 66.

Figure 4:
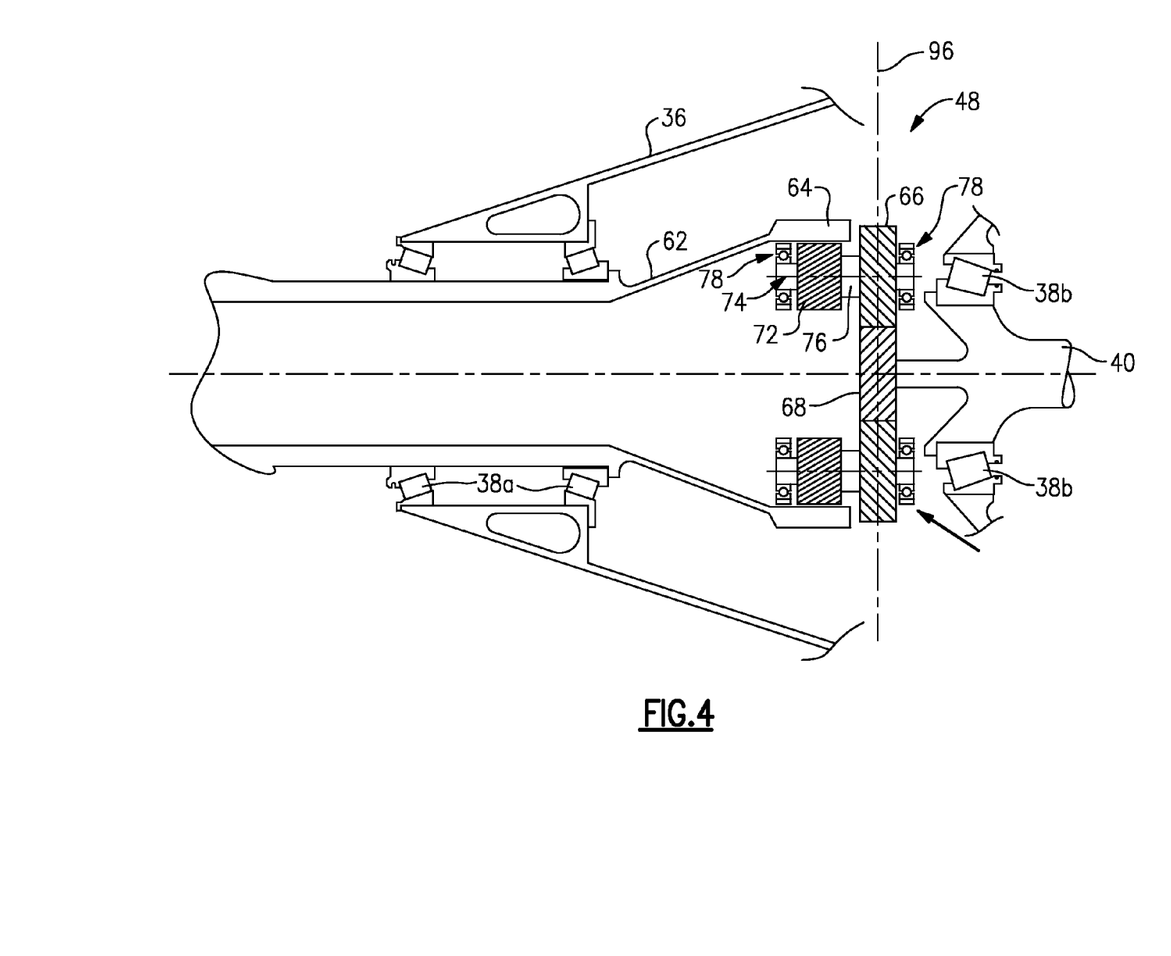
FIG. 4 is a cross-sectional view of an example disclosed compound star gear system.

Referring to FIG. 4, the example star geared architecture 48 is a compound star gear system, that is, it has stars which are axially offset along the engine core axis. In the example compound star gear system, a sun gear 68 rotates about the engine axis A and is driven by the inner shaft 40. The inner shaft 40 is driven by the low pressure turbine 46. However it should be understood that any turbine section could be utilized to drive the example sun gear 68. Although the example engines 20 and 20a include a high pressure turbine section 54 and a low pressure turbine section 46, an additional intermediate turbine section could be utilized to drive the geared architecture 48 and is within the contemplation of this disclosure.

The star gear system includes the sun gear 68 driven by the inner shaft 40. The inner shaft 40 is supported on bearings 38b for rotation about the engine axis A. The sun gear 68 in turn drives a first plurality of star gears 66 disposed within a first plane 96 common to the sun gear 68. The first plurality of star gears 66 are supported on a shaft 76 that is in turn supported by rolling bearing elements 78. The shaft 76 is mounted between the rolling bearing elements 78 and supports a second plurality of star gears 72.

The second plurality of star gears 72 are fixed to the shaft 76 such that rotation of the first plurality of star gears 66 drives the second plurality of star gears 72 at a common speed. The second plurality of star gears 72 is disposed within a second plane 98 that is forward of the first plane 96 and first plurality of sun gears 66.

A ring gear 64 is disposed about and driven by the second plurality of star gears 72. The ring gear 64 is an integral portion of the fan shaft 62 that is utilized to drive the fan section 22. The fan shaft 62 is in turn supported for rotations by bearing assemblies 38a supported on the static structure 36.

The bearing assemblies 38a and 38b comprise tapered bearing assemblies that counter thrust loads incurred during operation of the gas turbine engine.

Figure 5:
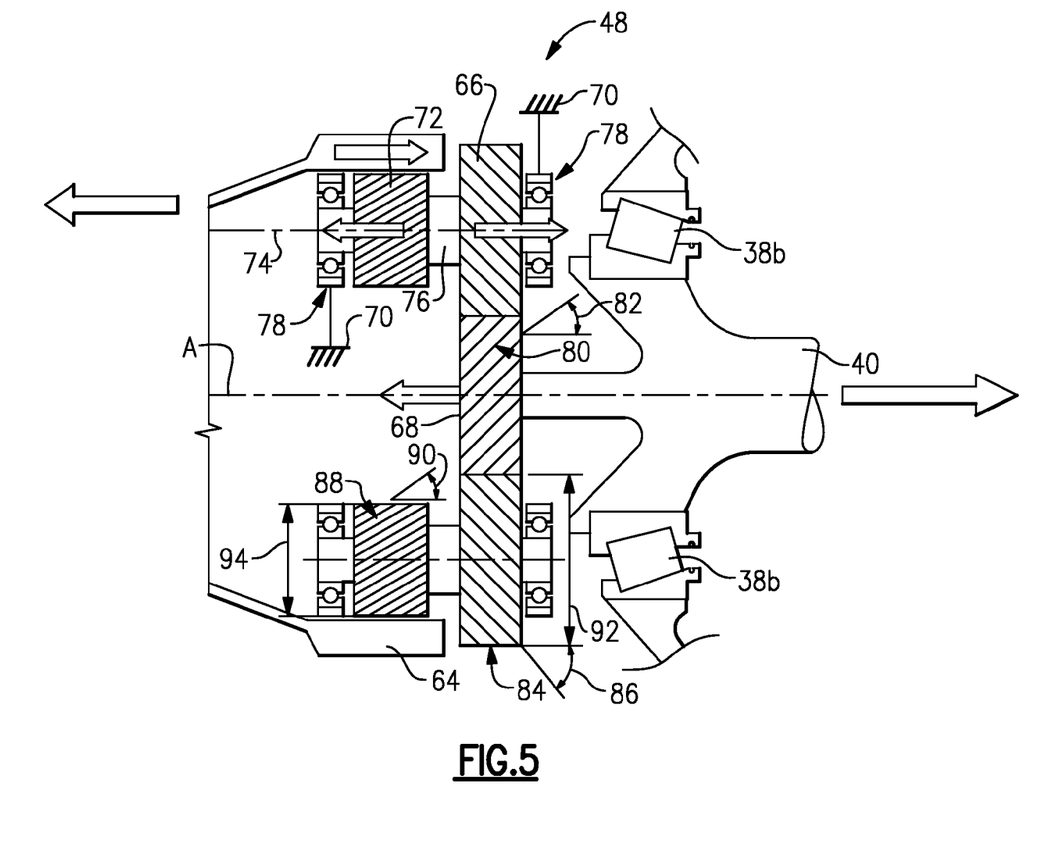
FIG. 5 is an enlarged view of the example compound star gear system.

Referring to FIG. 5 with continued reference to FIG. 4, the compound star gear system 48 includes the first plurality of star gears 66 that are in meshing engagement with the sun gear 68. The first plurality of star gears 66 are supported on shafts 76 that are fixed relative to the engine axis A. The shafts 76 are supported by the fixed carrier assembly 70 (schematically shown) and do not rotate about the engine axis A.

The first plurality of star gears 66 include a first diameter 92 and the second plurality of star gears 72 include a second diameter 94 that is different than the first diameter 92. The first diameter 92 is greater than the second diameter 94. The different diameters 92, 94 make possible a broader range of gear ratios in within a common space as compared to traditional star gear system.

The reduction ratio provided by the compound star gear system is equal to the multiplication of: (1) the ratio of the number of teeth (N2) provided on each of the star gears 66 over the number of teeth (N1) that are provided on the sun gear 68; and (2) the ratio of the number of teeth (N4) provided on the ring gear 64 over the number of teeth (N3) provided on the second plurality of star gears 72 as set out in the below equation.

$$\text{Reduction ratio} = (N2/N1) * (N4/N3)$$

The use of the first and second plurality of star gears 66,72 in unison that rotate at a common speed and are supported on the common shaft 76 provide a greater range of gear ratios of the star gear system while utilizing rolling bearing elements 78.

Figure 6:
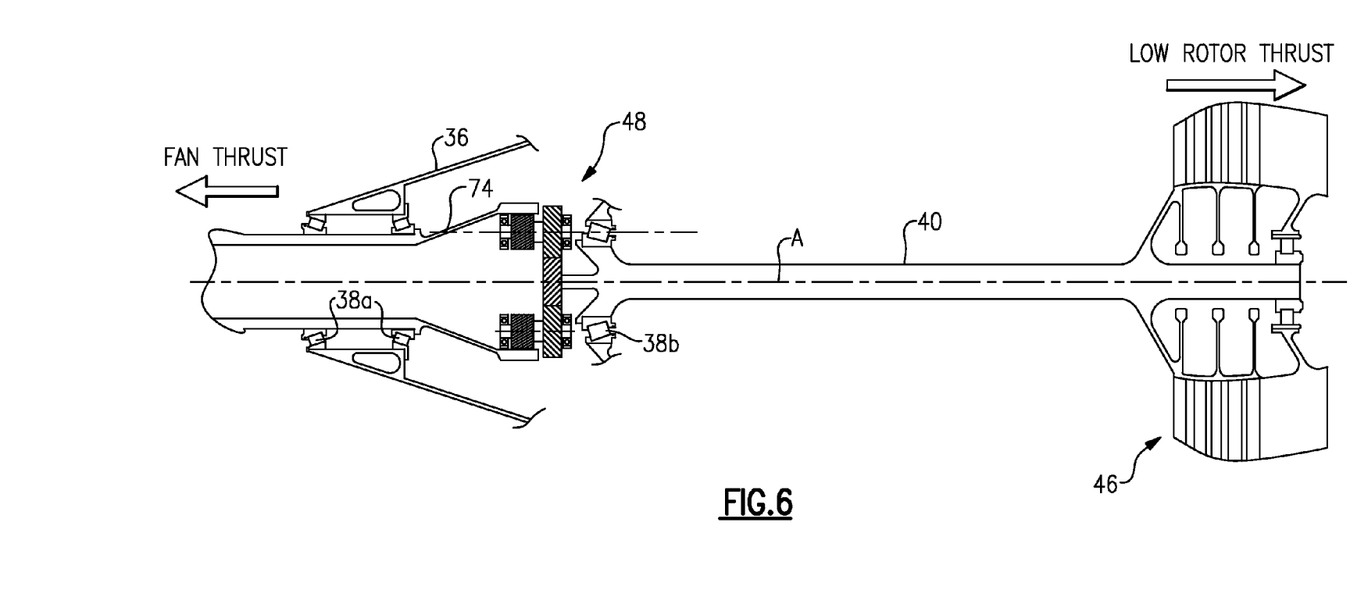
FIG. 6 is a cross-sectional view of an example compound star gear system and turbine section.

Referring to FIGS. 5 and 6, the star gear system 48 includes features that counter thrust forces encountered during engine operation. The low pressure turbine 46 drives the sun gear 68 through the inner shaft 40. The low pressure turbine 46 develops a thrust force in an aft direction that should be countered in order to maintain balance with the engine during operation.

The tapered bearing assemblies 38b that support rotation of the inner shaft 40 provide some measure of counter balance to the aft thrust produced by the low pressure turbine 46. The fan section 22 produces a thrust in a forward direction. However, the thrust produced by the fan section 22 is disconnected from the inner shaft 40 and therefore the low pressure turbine 46. Therefore, other measures are utilized to counter thrust forces produced by the fan 22 in the forward direction. The bearing assemblies 38a are tapered and provide some counter balance to the forward thrust produced by the fan section 22.

The star gear system 48 includes features that counter thrust produced during operation. Each of the sun gear 68 and the first and second pluralities of star gears 66, 72 are helical gears that include teeth disposed at a helix angle. In this example, the sun gear 68 includes a plurality of helical gear teeth 80 that are disposed at an angle 82. The corresponding first plurality of star gears 66 driven by the sun gear 68 include helical gear teeth 84 that are disposed at an angle 86 opposite the angle 82 to provide a balancing of thrust generated during operation.

The second plurality of star gears 72 is engaged to the ring gear 64. The second plurality of star gears 72 includes helical gear teeth 88 that are disposed at a helix angle 90. The helix angle 90 is disposed in a direction that is counter to the thrust generated by the first plurality of star gears 66 to provide a counter balancing effect through the star gear system 48.

The thrust loads generated by the helical gears are used to offset thrust loads in a forward direction generating by the fan section 22 and in an aft direction that are generated by the low pressure turbine 46.

In this example, the star gears 66 are supported on a common shaft 76 that is in turn supported by rolling bearing elements 78 about the axes 74. In one disclosed example, the rolling elements 78 comprise a plurality of spherical or ball bearing rolling elements. In other example, the rolling elements 78 comprise a plurality of cylindrical roller bearings. Moreover, the bearing assembly 78 may comprise a plurality of tapered roller bearings that support rotation and provide a countering of thrust forces generated during operation.

Accordingly, the example compound star gear system 48 provides for the use of rolling element bearing assemblies to support rotation of the star gears while also providing for an expansion of the available gear reduction range that is capable of bearing and operating under the loads generated during engine operation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear assembly comprising:
   a sun gear rotatable about a first axis, wherein the sun gear is fixed to a shaft driven by a turbine section of the gas turbine engine;
   a first plurality of star gears directly engaged to the sun gear and rotatable about a plurality of fixed axes;
   a second plurality of star gears rotatable with the first plurality of star gears about the plurality of fixed axes;
   a ring gear directly engaged to the second plurality of star gears; and
   a fan drive shaft driven by the ring gear, wherein sun gear and the first plurality of star gears are engaged within a first plane and the second plurality of star gears and the ring ear are engaged within a second plane spaced axially apart from the first plane, wherein each of the first plane and the second plane are disposed perpendicular to both the first axis and the plurality of fixed axes.

2. The fan drive gear assembly as recited in claim 1, wherein each of the first plurality of star gears comprises a first diameter and each of the second plurality of star gears comprises a second diameter greater than the first diameter.

3. The fan drive gear assembly as recited in claim 1, wherein the first plurality of star gears and the second plurality of star gears are supported for rotation by corresponding pluralities of rolling elements.

4. The fan drive gear assembly as recited in claim 3, wherein the rolling elements comprise cylindrical roller bearings.

5. The fan drive gear assembly as recited in claim 3, wherein the rolling elements comprise spherical roller bearings.

6. The fan drive gear assembly as recited in claim 3, wherein the rolling elements comprise tapered roller bearings.

7. The fan drive gear assembly as recited in claim 3, including a plurality of shafts supporting rotation of the first and second plurality of star gears.

8. The fan drive gear assembly as recited in claim 1, wherein the first plurality of star gears comprise helical gears including a first helix angle and the second plurality of star gears comprise helical gears including a second helix angle opposite the first helix angle.

9. The fan drive gear assembly as recited in claim 8, wherein the sun gear comprises a helical gear including a primary helix angle disposed opposite the first helix angle of the first plurality of star gears.

10. The fan drive gear assembly as recited in claim 1, including a carrier supporting the plurality of first star gears and second star gears.

11. The fan drive gear assembly as recited in claim 1, wherein the gear assembly comprises a gear reduction ratio up to 5.0.

12. A gas turbine engine comprising:
a fan rotatable about an engine axis;
a core engine section including a turbine section rotating at a first speed; and
a fan drive gear system driven by the turbine section for driving the fan, the fan drive gear system including a sun gear fixed to a shaft driven by the turbine section at the first speed, the sun gear rotatable about the engine axis, a first plurality of star gears directly engaged with the sun gear and rotatable about a plurality of fixed axes, a second plurality of star gears rotatable with the first plurality of star gears about the plurality of fixed axes, a ring gear directly engaged with the second plurality of star gears, and a fan drive shaft driven by the ring gear, wherein the first plurality of star gears and the sun gear are disposed within a first plane perpendicular to the engine axis and the second plurality of star gears are disposed within a second plane perpendicular to the engine axis and spaced axially apart from the first plane.

13. The gas turbine engine as recited in claim 12, wherein the core engine section includes a compressor section having a low pressure compressor and a high pressure compressor and the low pressure compressor is driven at a speed common with the fan drive shaft.

14. The gas turbine engine as recited in claim 12, wherein the core engine section includes a compressor section having a low pressure compressor and a high pressure and the turbine section includes a low pressure turbine and a high pressure turbine and the low pressure compressor is rotated at a speed common with the low pressure turbine.

15. The gas turbine engine as recited in claim 12, wherein the fan drive gear system includes a gear reduction ratio of up to 5.0.

16. The gas turbine engine as recited in claim 12, wherein the first and second plurality of star gears are supported by rolling element bearings.

17. The gas turbine engine as recited in claim 16, wherein the rolling element bearings comprise cylindrical roller bearings.

18. The gas turbine engine as recited in claim 16, wherein the rolling element bearings comprise spherical roller bearings.

19. The gas turbine engine as recited in claim 16, wherein the rolling element bearings comprise tapered roller bearings.

* * * * *

UNITED STATES PATENT AND TRADEMARK OFFICE
CERTIFICATE OF CORRECTION

Page 1 of 1

PATENT NO.        : 9,926,850 B2
APPLICATION NO.   : 14/170687
DATED             : March 27, 2018
INVENTOR(S)       : Sheridan It is certified that error appears in the above-identified patent and that said Letters Patent is hereby corrected as shown below:

In the Claims

In Claim 1, Column 8, Line 31; replace "ring ear" with --ring gear--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*